Sept. 4, 1934.  P. H. FRANK  1,972,140
ROLLER BEARING
Filed Jan. 17, 1934  2 Sheets-Sheet 1
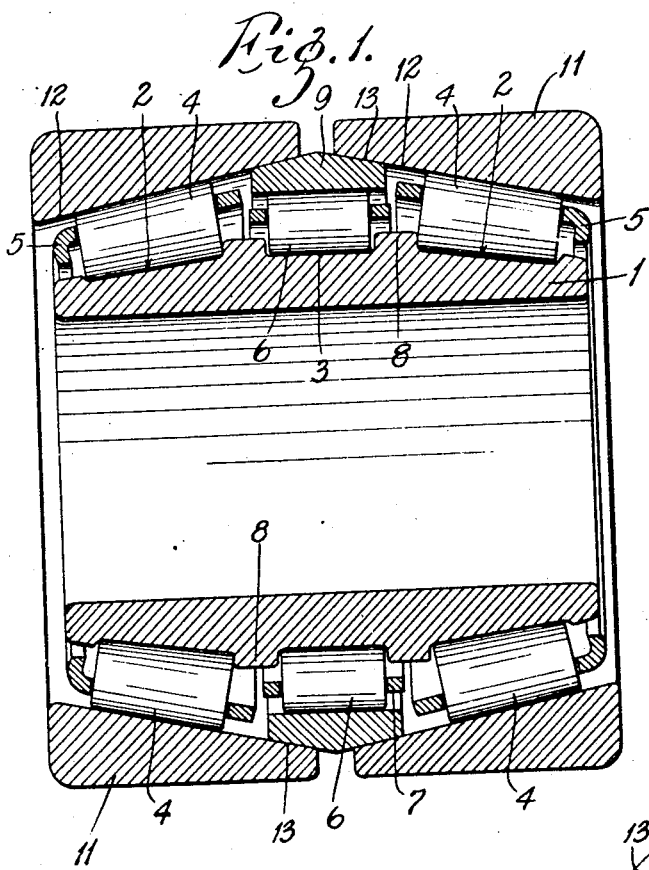
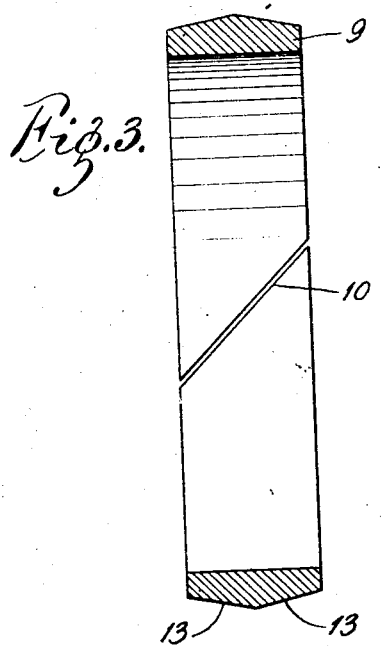
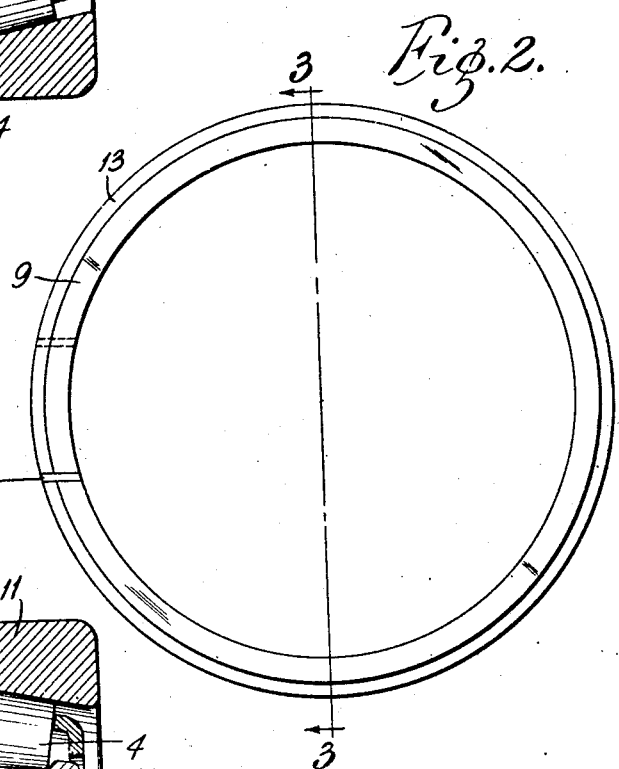
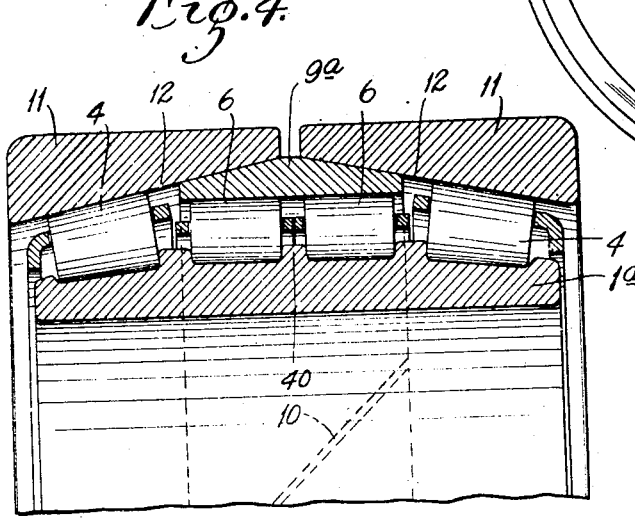
INVENTOR:
Pardee H. Frank,
by Cantlan & Gravely,
HIS ATTORNEYS.

Sept. 4, 1934.   P. H. FRANK   1,972,140
ROLLER BEARING
Filed Jan. 17, 1934   2 Sheets-Sheet 2
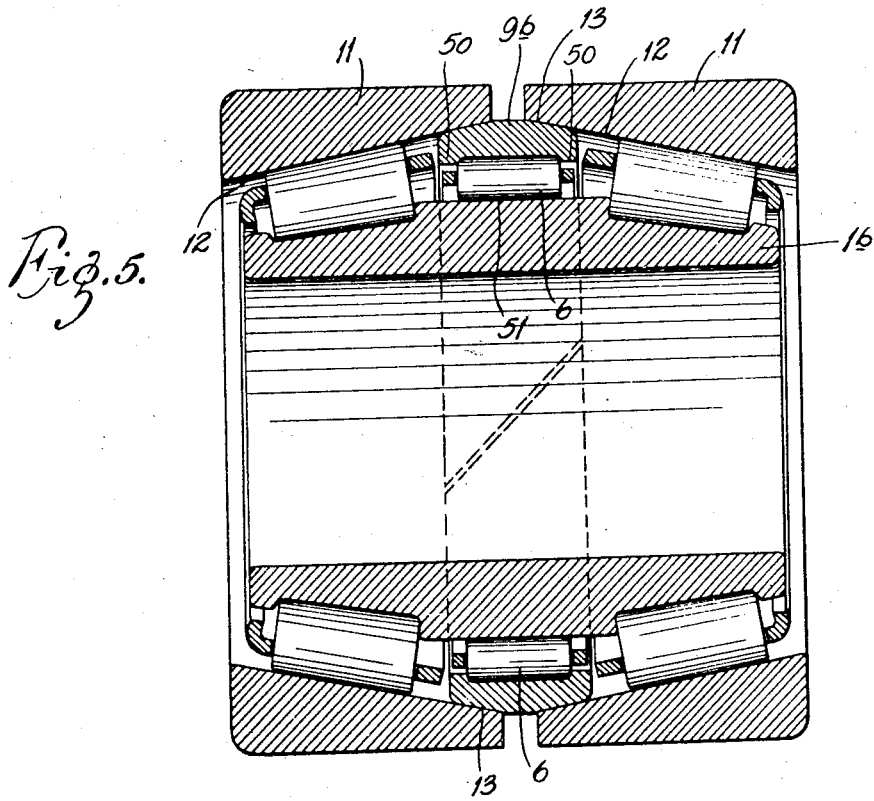
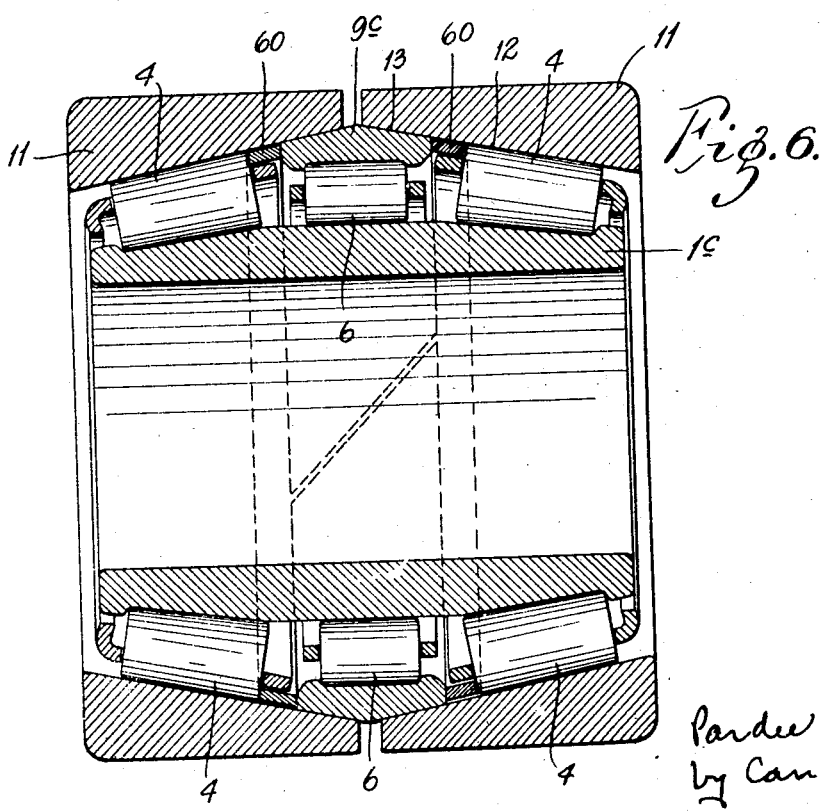

Patented Sept. 4, 1934

1,972,140

UNITED STATES PATENT OFFICE 1,972,140

ROLLER BEARING

Pardee H. Frank, Canton, Ohio, assignor to The Timken Roller Bearing Company, Canton, Ohio, a corporation of Ohio Application January 17, 1934, Serial No. 706,918

4 Claims. (Cl. 308—214)

My invention relates to roller bearings, particularly to bearings adapted for uses where the loads are heavy and the space available for bearings is limited. The bearing is especially adapted for use in rolling mills and other machines wherein the bearing is mounted on a rotary shaft, roll or spindle, the outer bearing member of the bearing remaining stationary.

The invention consists principally in a roller bearing having two series of tapered rollers and one or more intermediate series of cylindrical rollers, the outer bearing member of said cylindrical rollers being split likewise and having conical outer surface portions fitting in the conical bores of the cups of said conical rollers. The invention further consists in the roller bearing and in the parts and combinations and arrangements of parts hereinafter described and claimed.

In the accompanying drawings wherein like reference characters indicate like parts wherever they occur, Fig. 1 is a longitudinal sectional view of a roller bearing embodying my invention, Fig. 2 is an elevation of the outer bearing member of the cylindrical rollers thereof, Fig. 3 is a sectional view of said outer bearing member; and Figs 4, 5 and 6 are half sectional views of modifications.

In machinery, such as rolling mills, wherein the loads are heavy and the space available for the mounting of bearings is limited, the use of roller bearings has involved serious problems. The present invention combines cylindrical and conical rollers into a very compact bearing which takes care of heavy loads and also accommodates end thrust.

In Fig. 1 is illustrated a bearing having an inner bearing member 1 that is provided with conical raceways 2 at its outer ends tapering toward the ends of said bearing member and with a cylindrical raceway 3 at its middle. On said conical raceways 2 are mounted conical rollers 4 provided with suitable cages 5 and on the cylindrical raceway 3 are mounted cylindrical rollers 6 provided with a suitable cage 7. The inner bearing member is provided with thrust ribs 8 against which the large ends of said conical rollers 4 abut. The opposing faces of said thrust ribs define the ends of said cylindrical raceway 3.

The cup 9 or outer bearing member for the cylindrical rollers is split, preferably along an oblique line 10 as indicated. The cups 11 or outer bearing members of the conical rollers are large enough to overlap the ends of said outer bearing member and the portions of the cup bores beyond the conical raceways 12 have the same taper as said raceways. The outer raceway of said outer bearing member 9 has reversely coned portions 13 of the same taper as the bores of the bearing members into which they extend.

Obviously by moving the conical bearing cups 11 endwise, the taper rollers 4 may be adjusted for wear and also the outer bearing member 9 of the cylindrical rollers is reduced in size to compensate for wear of said cylindrical rollers 6. Preferably the bearing is mounted in a rolling mill or other device where the outer bearing member is stationary; and the split 10 of said outer bearing member can thus be located in an unloaded or lightly loaded zone. This arrangement together with the obliquity of said split minimizes the disadvantages ordinarily found in split bearing member constructions.

Fig. 4 shows a modification wherein there are two intermediate series of cylindrical rollers 6 provided with a common outer bearing member 9a. The inner bearing member 1a is provided with a rib 40 between the two series of cylindrical rollers.

In Fig. 5 is illustrated a modification wherein the retaining ribs 50 for the cylindrical rollers are provided in the ends of the outer bearing members 9b, the cylindrical rollers 6 running on a plain surface 51 of the inner bearing member 1b.

In Fig. 6 is illustrated a modification wherein the inner bearing member 1c is free from thrust ribs. Thrust rings 60 are provided between the outer bearing member 9c and the ends of the conical rollers 4. These thrust rings 60 are preferably of integral construction and may be slightly smaller than the bore of the cups 11 so as to permit adjustment of the bearing.

The above described bearing has the important advantage of great load carrying ability combined with compactness and the further advantage of permitting adjustment for wear of the cylindrical rollers as well as of the conical rollers. Obviously numerous changes may be made without departing from the invention and I do not wish to be limited to the precise construction shown.

What I claim is:

1. A roller bearing comprising an inner bearing member having conical raceways at its ends and an intermediate cylindrical raceway, conical rollers for said conical raceways, cylindrical rollers for said cylindrical raceway, a split outer bearing member for said cylindrical rollers having reversely coned outer surface portions and outer bearing members for said conical rollers having conical bores fitting over said conical portions of said cylindrical outer bearing member.

2. A roller bearing comprising an inner bearing member having conical raceways at its ends and an intermediate cylindrical raceway, conical rollers for said conical raceways, cylindrical rollers for said cylindrical raceway, an obliquely split outer bearing member for said cylindrical rollers having reversely coned outer surface portions and outer bearing members for said conical rollers having conical bores fitting over said conical portions of said cylindrical outer bearing member.

3. A roller bearing comprising an inner bearing member having conical raceways at its ends and an intermediate cylindrical raceway, conical rollers for said conical raceways, cylindrical rollers for said cylindrical raceway, a split outer bearing member for said cylindrical rollers having reversely coned outer surface portions and outer bearing members for said conical rollers having conical bores fitting over said conical portions of said cylindrical outer bearing member, said outer bearing members being stationary and said split outer bearing member being positioned with its split portion outside the heavy load zone.

4. A roller bearing comprising an inner bearing member having conical raceways at its ends and an intermediate cylindrical raceway, conical rollers for said conical raceways, cylindrical rollers for said cylindrical raceway, a split outer bearing member for said cylindrical rollers having reversely coned outer surface portions, outer bearing members for said conical rollers having conical bores fitting over said conical portions of said cylindrical outer bearing member and thrust rings for said conical rollers interposed between said split outer bearing member and said rollers.

PARDEE H. FISK.